(12) United States Patent
Bidkar et al.

(10) Patent No.: US 9,359,908 B2
(45) Date of Patent: Jun. 7, 2016

(54) FILM RIDING SEAL ASSEMBLY FOR TURBOMACHINERY

(71) Applicant: General Electric Company, Schenectady, NY (US)

(72) Inventors: Rahul Anil Bidkar, Niskayuna, NY (US); Andrew Paul Giametta, Greenville, SC (US); Nathan Evan McCurdy Gibson, West Chester, OH (US); Nicolas Joseph Cleveland, Cohoes, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 14/325,452

(22) Filed: Jul. 8, 2014

(65) Prior Publication Data

US 2016/0010480 A1    Jan. 14, 2016

(51) Int. Cl.
*F16J 15/44* (2006.01)
*F01D 11/02* (2006.01)
*F16J 15/447* (2006.01)

(52) U.S. Cl.
CPC ............. *F01D 11/02* (2013.01); *F16J 15/4478* (2013.01)

(58) Field of Classification Search
CPC ..................................................... F01D 11/04
USPC ......... 277/411, 412, 413, 500, 543, 546, 578; 415/115
See application file for complete search history.

(56) References Cited

U.S. PATENT DOCUMENTS

| | | | |
|---|---|---|---|
| 2,181,203 A * | 11/1939 | Reynolds | 277/504 |
| 4,513,567 A | 4/1985 | Deveau et al. | |
| 5,244,216 A | 9/1993 | Rhode | |
| 6,505,837 B1 * | 1/2003 | Heshmat | 277/411 |
| 6,840,519 B2 * | 1/2005 | Dinc et al. | 277/413 |
| 8,388,311 B2 | 3/2013 | Yamaguchi et al. | |
| 2005/0200080 A1 | 9/2005 | Baghdadi et al. | |
| 2010/0007093 A1 | 1/2010 | Grondahl | |
| 2010/0143101 A1 | 6/2010 | Fang et al. | |
| 2012/0223483 A1 | 9/2012 | Bidkar et al. | |

FOREIGN PATENT DOCUMENTS

WO    2012052740 A1    4/2012

OTHER PUBLICATIONS

Uth et al., "Advanced Aerodynamic Sealing System for Thermo Turbo Machinery", International Joint Power Generation Conference collocated with TurboExpo 2003, pp. 553-560, 2003.
Kim et al., "Aerodynamic Performance of Double-Sided Labyrinth Seals", Fluid Machinery and Fluid Mechanics, pp. 377-382, 2008.

* cited by examiner

*Primary Examiner* — Kristina Fulton
*Assistant Examiner* — Eugene G Byrd
(74) *Attorney, Agent, or Firm* — John P. Darling

(57) ABSTRACT

An aerodynamic seal assembly for a rotary machine includes multiple sealing segments disposed circumferentially intermediate to a stationary housing and a rotor. Each of the segments includes a shoe plate with a forward load-bearing section and an aft load-bearing section configured to generate an aerodynamic force between the shoe plate and the rotor. The shoe plate includes at least one labyrinth teeth facing the rotor and positioned between the forward load-bearing section and the aft load-bearing section. The sealing segment also includes at least one spring connected to a pedestal located about midway of an axial length of the shoe plate and to a stator interface element. Further, the sealing segment includes a rigid segmented secondary seal attached to the stator interface element at one first end and in contact with the pedestal of the shoe plate at one second end.

22 Claims, 14 Drawing Sheets

FILM RIDING SEAL ASSEMBLY FOR TURBOMACHINERY

STATEMENT REGARDING FEDERALLY SPONSORED RESEARCH & DEVELOPMENT

This invention was made with partial Government support under contract number DE-FC26-05NT42643 awarded by U.S. Department of Energy. The Government has certain rights in the invention.

BACKGROUND

The present application relates generally to seal assemblies for turbo-machinery and more particularly relates to advanced aerodynamic seal assemblies for sealing rotor/stator gaps and the like.

Various types of turbo-machinery, such as gas turbine engines, aircraft engines and steam turbines, are known and widely used for power generation, propulsion, and the like. The efficiency of the turbo-machinery depends in part upon the clearances between the internal components and the leakage of primary and secondary fluids through these clearances. For example, large clearances may be intentionally allowed at certain rotor-stator interfaces to accommodate large, thermally or mechanically-induced, relative motions. Leakage of fluid through these gaps from regions of high pressure to regions of low pressure may result in poor efficiency for the turbo-machinery. Such leakage may impact efficiency in that the leaked fluids fail to perform useful work.

Different types of sealing systems are used to minimize the leakage of fluid flowing through turbo-machinery. The sealing systems, however, often are subject to relatively high temperatures, thermal gradients, and thermal and mechanical expansion and contraction during various operational stages that may increase or decrease the clearance therethrough. For example, traditional labyrinth seals that are assembled to run very tight clearance during start-up transient phase might run with large clearances during steady state operations, thereby leading to poor performance at steady state operation.

There is therefore a desire for improved compliant sealing assemblies for use with turbo-machinery. Preferably such compliant sealing assemblies may provide tighter sealing during steady state operations while avoiding rubbing, wear caused by contact and damage during transient operations. Such sealing assemblies should improve overall system efficiency while being inexpensive to fabricate and providing an increased life for the associated parts.

BRIEF DESCRIPTION

In accordance with an example of the present technology, an aerodynamic seal assembly for a rotary machine includes multiple sealing segments disposed circumferentially intermediate to a stationary housing and a rotor. Each of the segments includes a shoe plate with a forward load-bearing section and an aft load-bearing section configured to generate an aerodynamic force between the shoe plate and the rotor. The shoe plate includes at least one labyrinth teeth facing the rotor and positioned between the forward load-bearing section and the aft load-bearing section, and is configured to allow a flow of high pressure fluid into a front portion of the at least one labyrinth teeth and a low pressure fluid into a rear portion of the at least one labyrinth teeth. The sealing segment also includes at least one spring connected to a pedestal located about midway of an axial length of the shoe plate and to a stator interface element. Further, the sealing segment includes a rigid segmented secondary seal attached to the stator interface element at one first end and in contact with the pedestal of the shoe plate at one second end.

In accordance with an example of the present technology, a method of forming a gas path seal between a stationary housing of a rotary machine and a rotatable element turning about an axis of the rotary machine includes disposing multiple sealing segments intermediate to the stationary housing and the rotatable element. Each of the sealing segments includes a shoe plate with a forward load-bearing section and an aft load-bearing section configured to generate an aerodynamic force between the shoe plate and the rotor and includes at least one labyrinth teeth therebetween facing the rotor. The method also includes connecting at least one spring to a pedestal located about midway of an axial length of the shoe plate and to a stator interface element. Further, the method includes attaching a rigid segmented secondary seal to the stator interface element at one first end and in contact with the pedestal of the shoe plate at one second end.

In accordance with another example of the present technology, a rotary machine includes an aerodynamic seal assembly having multiple sealing segments disposed circumferentially intermediate to a stationary housing and a rotor. Each of the segments includes a shoe plate with a forward load-bearing section and an aft load-bearing section configured to generate an aerodynamic force between the shoe plate and the rotor. The shoe plate includes at least one labyrinth teeth facing the rotor and positioned between the forward load-bearing section and the aft load-bearing section, and is configured to allow a flow of high pressure fluid into a front portion of the at least one labyrinth teeth and a low pressure fluid into a rear portion of the at least one labyrinth teeth. The sealing segment also includes at least one spring connected to a pedestal located about midway of an axial length of the shoe plate and to a stator interface element. Further, the sealing segment includes a rigid segmented secondary seal attached to the stator interface element at one first end and in contact with the pedestal of the shoe plate at one second end.

In accordance with yet another example of the present technology, an aerodynamic seal assembly for a rotary machine includes multiple sealing segments disposed circumferentially intermediate to a stationary housing and a rotor. Each of the sealing segments includes a shoe plate with a forward load-bearing section and an aft load-bearing section configured to generate an aerodynamic force between the shoe plate and the rotor. The shoe plate includes at least one labyrinth teeth facing the rotor and positioned between the forward load-bearing section and the aft load-bearing section. Further, the shoe plate is configured to allow a flow of high pressure fluid into a front portion of the at least one labyrinth teeth and a low pressure fluid into a rear portion of the at least one labyrinth teeth. Each of the sealing segments also includes at least one spring connected to a pedestal located about midway of an axial length of the shoe plate and to a stator interface element, and a rigid segmented secondary seal attached to the stator interface element and in contact with the pedestal of the shoe plate.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters are not exclusive of other parameters of the disclosed embodiments.

Figure 1:
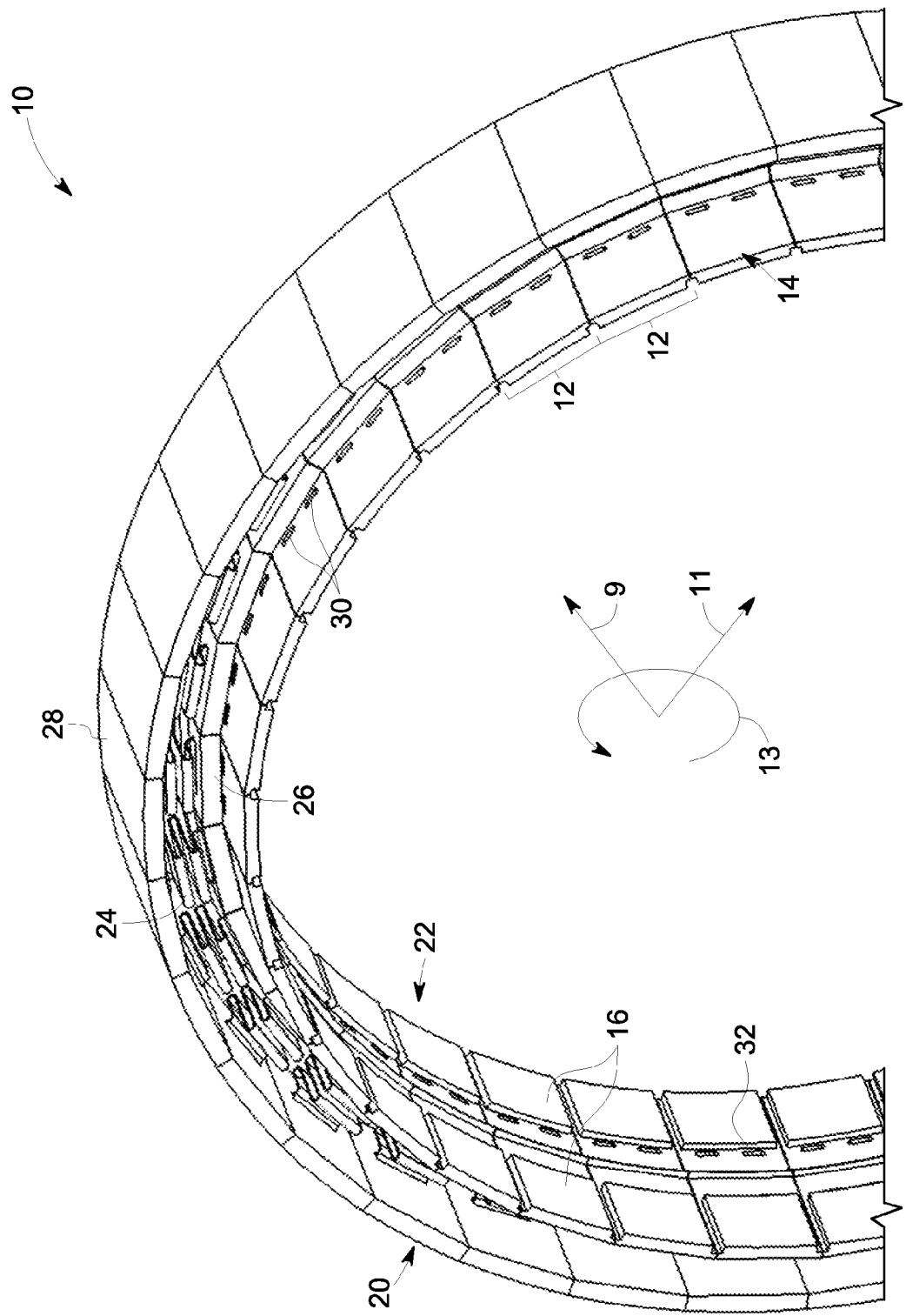
FIG. 1 is a perspective view of an aerodynamic seal assembly for a rotary machine in accordance with an example of the present technology.

FIG. 1 is a perspective view of an aerodynamic seal assembly 10 for a rotary machine in accordance with an example of the present technology. The seal assembly 10 is shown to have an orientation in axial, radial and circumferential direction as given by 9, 11 and 13 respectively. The seal assembly 10 is circumferentially arranged around a rotor shaft (not shown) such that the seal assembly 10 is intermediate to a stationary housing (not shown) and the rotor shaft. The seal assembly 10 includes multiple sealing segments 12 located adjacent to each other to form the seal assembly 10. Each of the sealing segment 12 includes a shoe plate 14 located proximate to the rotor shaft. During operation of the rotary machine, the shoe plate 14 rides on a fluid film above the rotor shaft. The shoe plate 14 includes two load-bearing sections 16 that are configured to generate an aerodynamic force between the shoe plate 14 and the rotor. The shoe plate 14 also includes at least one labyrinth teeth 18 facing the rotor and positioned between the two load-bearing sections 16. The at least one labyrinth teeth 18 substantially separate fluids from a high pressure region 20 from a low pressure region 22 on either sides of the aerodynamic seal assembly 10 of the rotary machine. The sealing segment 12 includes at least one bellow spring 24 connected to a pedestal 26 located about midway of an axial length of the shoe plate 14 and to a stator interface element 28. In one example, the sealing segment 12 also includes multiple bellow springs or flexures. The one or more bellow springs or flexures provide radial compliance, rotational rigidity about circumferential and axial direction of the sealing segment 12. The one or more bellow springs or flexures may also guide the motion of the shoe plate 14 along the radial and axial direction. In one example, the seal assembly 10 includes the stator interface elements that are joined together to form a single non-segmented stator interface. The shoe plate 14 of each of sealing segments 12 also includes one or more forward ports 30 and one or more aft ports 32 configured to allow a flow of high pressure fluid into a front portion of the at least one labyrinth teeth 18 and a low pressure fluid into a rear portion of the at least one labyrinth teeth 18 respectively.

Each of the sealing segments 12 are assembled relative to the rotor such that there is a clearance gap between each shoe plate 14 and the rotor shaft. The adjacent sealing segments 12 also include a clearance gap between them. Each of the sealing segments 12 is described in detail in FIG. 2.

Further, in one example, the shoe plate 14 and the stator interface element 28 are manufactured by machining a suitable metal or steel alloy. In another example, the shoe plate 14 and the stator interface element 28 are manufactured by casting the suitable metal or steel alloy. Furthermore, the innermost surfaces of the load-bearing sections 16 of the shoe plate 14 may be coated with lubricant coatings such as PS304 or PS400 or similar coatings for preventing damages incurred due to rubbing between the shoe plate and the rotor. Non-limiting examples of the coating materials may include graphite coating, diamond-like carbon, hexagonal boron nitride, chromium molybdenum nitride, chrome titanium aluminum nitride or similar lubricant embedded in a harder material to balance the lubrication, wear and thermal growth properties of the coating. In another example, the rotor surface interfacing with the shoe plate 14 may be coated with chromium carbide or titanium aluminum nitride or hexagonal boron nitride or similar coatings to improve rotor hardness, corrosion resistance and the ability to maintain a good surface finish.

Figure 2:
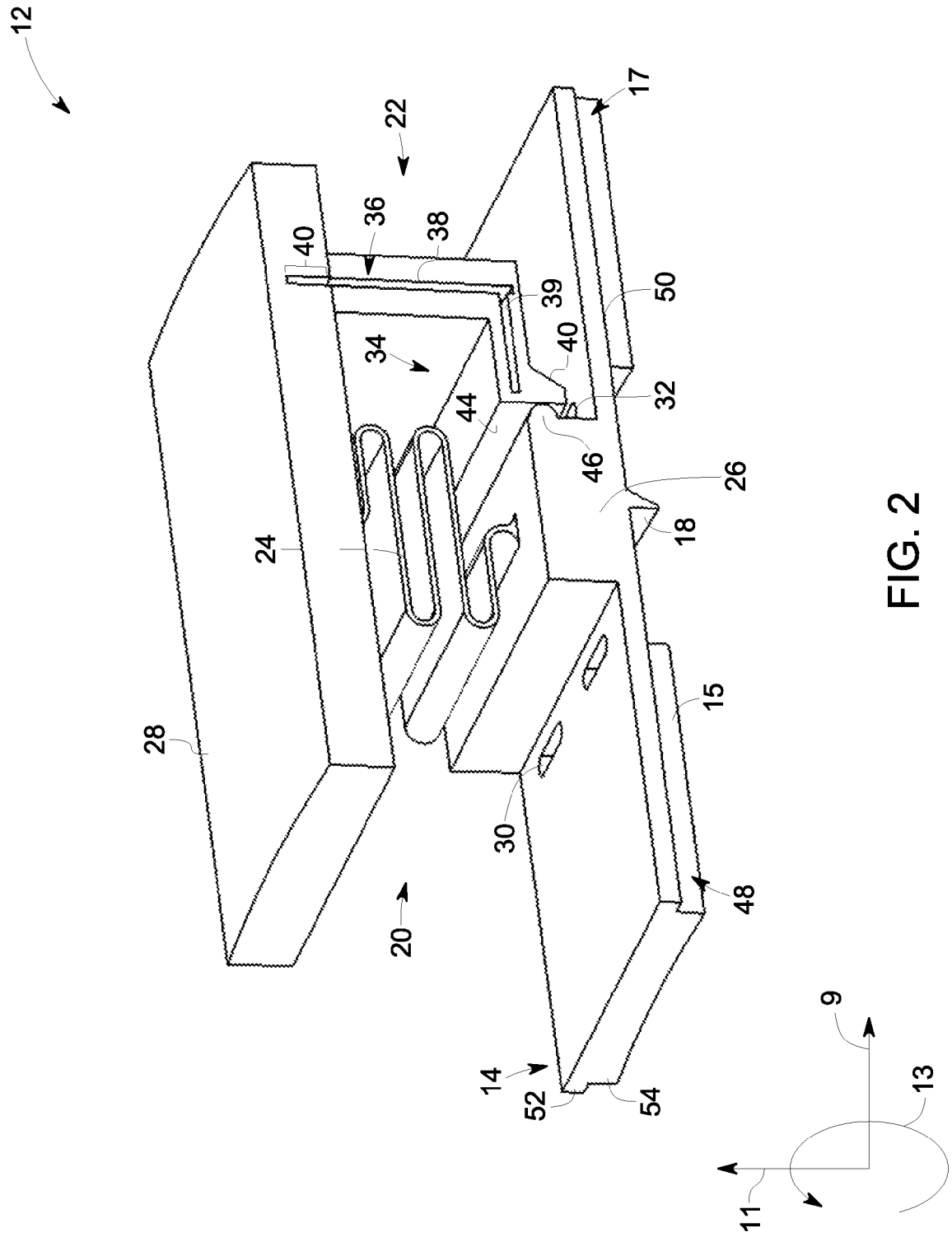
FIG. 2 is a perspective view of the sealing segment in accordance with an example of the present technology.

FIG. 2 is a perspective view of the sealing segment 12 in accordance with an example of the present technology. As shown, the sealing segment 12 includes the shoe plate 14 with a forward load-bearing section 15 and an aft-shoe section 17 having at least one labyrinth teeth 18 therebetween facing the rotor shaft (not shown). The sealing segment 12 includes the at least one bellow spring 24 that is connected to the pedestal 26 located about midway of an axial length of the shoe plate 14 and to the stator interface element 28. The radial stiffness of the bellow spring 24 may depend upon the axial width, the tangential width, the thickness of the bellows, the spacing between the bellow turns and the material for the bellow spring 24. Moreover, the bellows spring 24 is formed from Inconel X750 or Rene41 or similar high temperature alloys or in the case of low temperature applications will be made from an appropriate metal or composite material. Further, the bellow springs may either be formed from sheet metal and brazed to the stator interface element and the shoe plate 14 or may be fabricated by a machining process like wire Electrical Discharge Machining (EDM).

As shown, the shoe plate 14 also includes the forward ports 30 and the aft ports 32 for allowing the flow of high pressure fluids from the high pressure region 20 into the front portion of the at least one labyrinth teeth 18 and the low pressure fluid from the low pressure region 22 into the rear portion of the at least one labyrinth teeth 18 respectively.

The sealing segment 12 further includes a rigid segmented secondary seal 34 attached to the stator interface element 28 at one first end and in contact with the pedestal 26 of the shoe plate 14 at one second end. The purpose of the rigid segmented secondary seal 34 is to reduce the leakage of fluid flow through the radial space between the shoe plate 14 and the stator interface element 28. As shown, the rigid segmented secondary seal 34 is L-shaped and includes an L-shaped spline slot 36 forming a radial spline slot 38 and an axial spline slot 39 located at sides of the L-shaped rigid segmented secondary seal 34 for allowing splines to be inserted to prevent fluid leakages between adjacent sealing segments 12. The stator interface element 28 also includes a spline slot 40 that is aligned with the radial spline slot 38 located on the rigid segmented secondary seal 34. The second end of the rigid segmented secondary seal 34 includes a free end 42 that has a flat radial surface 44 in contact with a nose protrusion 46 of the pedestal 26, thereby, forming a line contact separating the high pressure side 20 and the low pressure side 22 on either side of the line contact. The high pressure fluids from the high pressure side 20 provides axial loading on the shoe plate 14 that presses the nose protrusion 46 against the flat radial surface 44 of the rigid segmented secondary seal 34. This contact force between the nose protrusion 46 and the rigid segmented secondary seal 34 forms a secondary sealing, thereby preventing fluid leakages. In one example of the present technology, the mating surfaces of the nose protrusion 46 and the flat radial surface 44 may be applied with friction coatings for preventing wear due to friction.

Further, the sealing segment 12 includes forward shoe feeding grooves 48 and aft shoe feeding grooves 50 at sides of the shoe plate 14 towards the high pressure side 20 and the low pressure side 22 of the rotary machine respectively. A top portion 52 of the shoe plate 14 includes a circumferential width that is wider than a bottom portion 54 forming the feeding grooves 48, 50.

Figure 3:
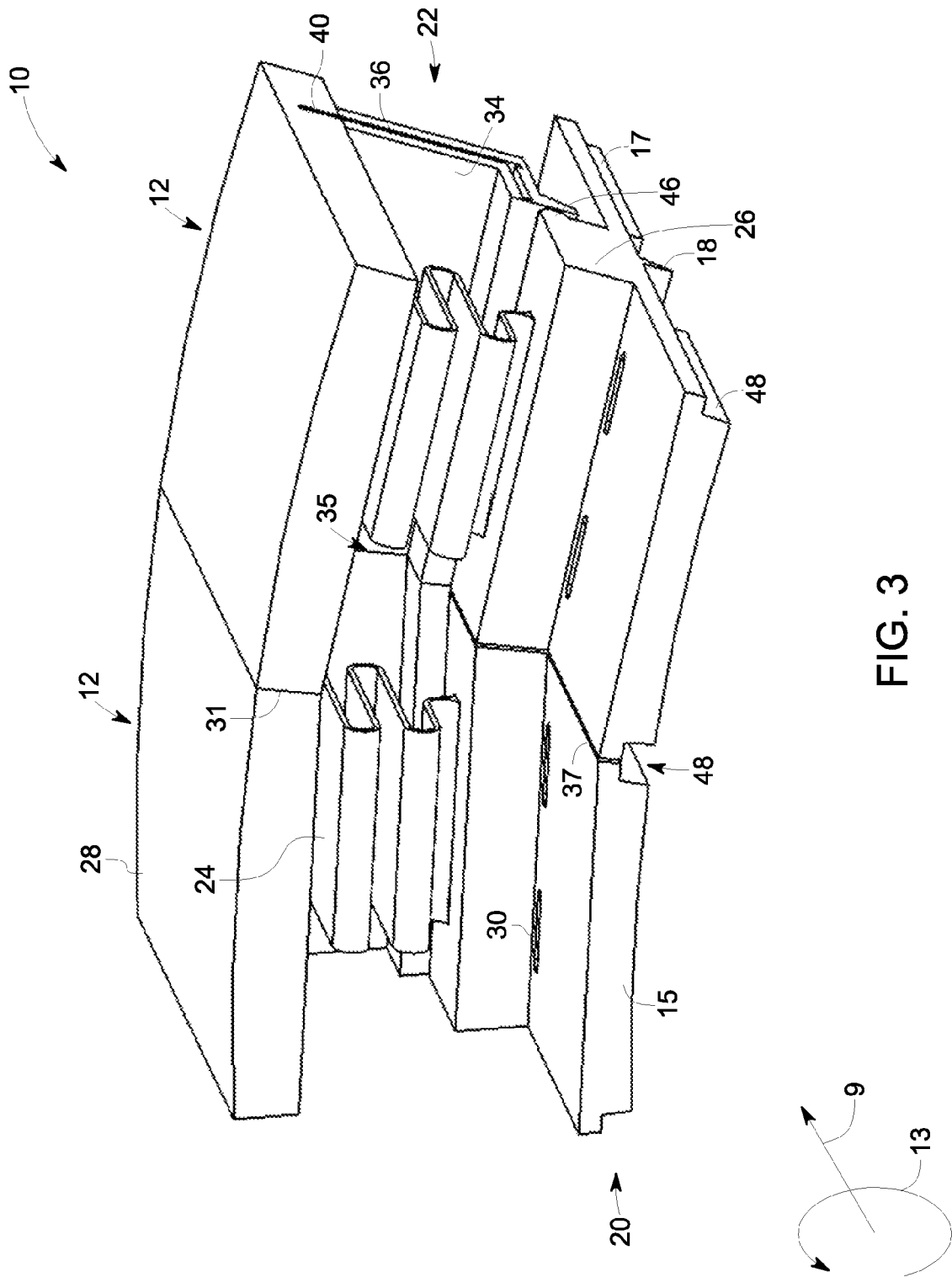
FIG. 3 is a perspective view of adjacent sealing segments of the aerodynamic seal assembly in accordance with an example of the present technology.

FIG. 3 show a portion of the seal assembly 10 having the forward shoe feeding groove 48 between adjacent sealing segments 12 towards the high pressure side 20 for allowing high pressure fluids to the front portion of the labyrinth teeth 18. As shown, the stator interface elements 28 form a part of the stator housing and has a stator-stator gap 31 between adjacent sealing segments 12. The adjacent rigid segmented secondary seals 34 also reveal a gap 35. The presence of spline seal elements (not shown) in the spline slots 36, 40 prevents fluid leakages through the gaps 31 and 35 between the rigid segmented secondary seals 34. The labyrinth teeth 18 of neighboring shoes also form a segment gap (not shown) between neighboring shoe plates. The seal assembly 10 also includes a segment gap 37 between neighboring shoe plates 14. The gap 37 is designed so that the radial motion of the sealing segments 12 towards the rotor and any circumferential thermal expansion of the segments 12 does not cause segment binding. In one example, the seal assembly 10 may attain an equilibrium riding clearance between the shoe plate 14 and the rotor of 0.3/1000 to 0.5/1000 inches with a slight tilt (with the shoe plate 14 closer to the rotor on either at a forward or at an aft edge).

Figure 4:
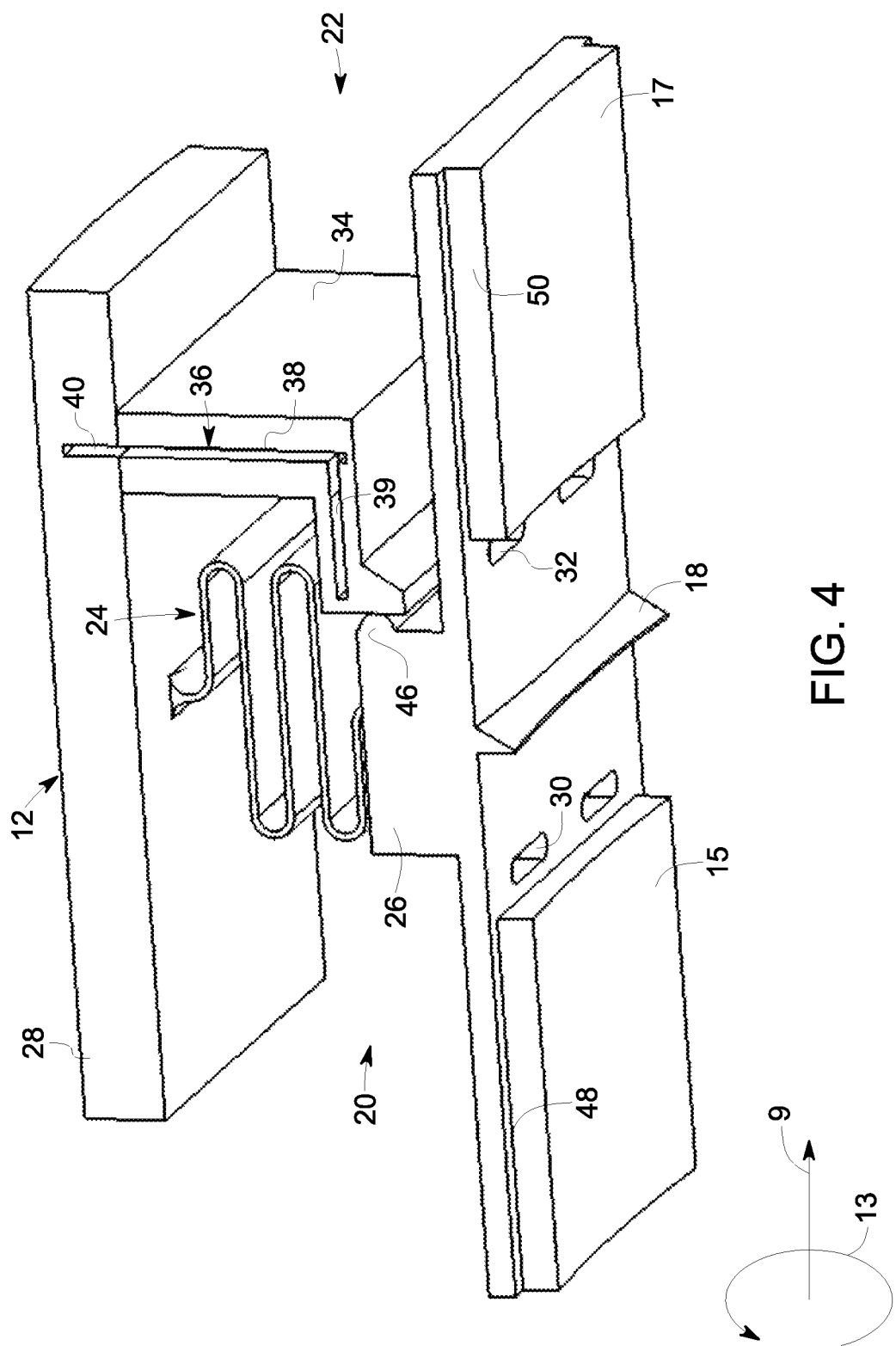
FIG. 4 is another perspective view of the sealing segment as shown in FIG. 3.

As shown in FIG. 3, the shoe plate 14 also includes multiple forward ports 30 located before the pedestal 26 at the high pressure side 20 of the rotary machine for allowing an axial flow of a fluid to a front portion of the labyrinth teeth 18. Further, the shoe plate 14 includes one or more aft ports 32 (as shown in FIG. 1 and FIG. 2) located after the pedestal 26 at a low pressure side 22 of the rotary machine. In one embodiment, the one or more aft ports 32 are angled in a circumferential direction to impart a tangential flow to a fluid flowing from behind the labyrinth teeth 18. In another embodiment, the one or more aft ports 32 are straight ports or circumferential angled ports for allowing the flow of fluid from behind the labyrinth teeth 18 of the sealing segment 12. Further, as shown in FIG. 3, each sealing segment 12 having the bellow spring 24 includes a circumferential width less than each of circumferential widths of the shoe plate to allow pressure equalization on either side of the bellow spring 24. FIG. 4 is another perspective view of the sealing segment 12 as shown in FIG. 3.

Figure 5:
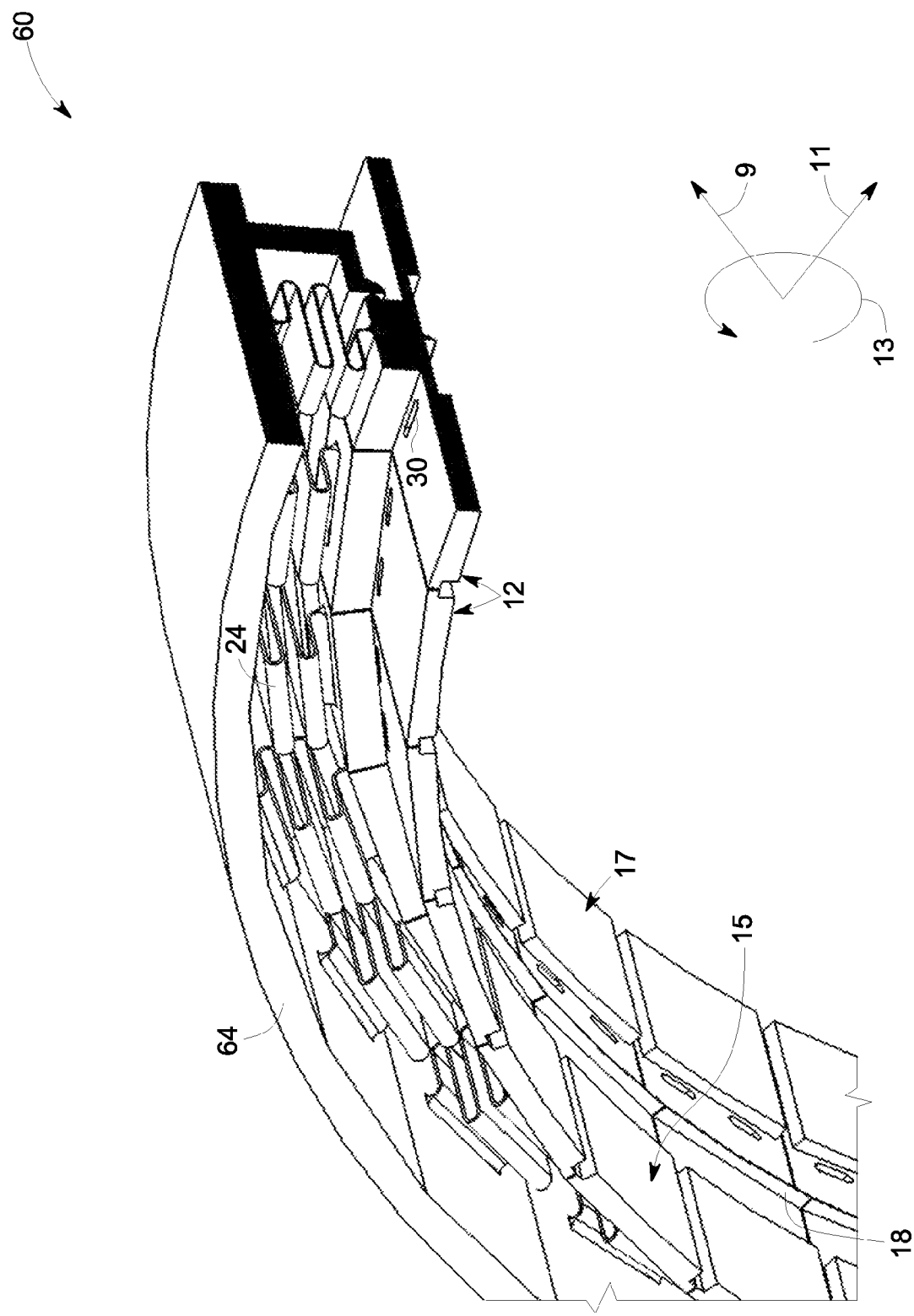
FIG. 5 is a portion of a seal assembly that shows a non-segmented rigid secondary seal in accordance with an example of the present technology.

FIG. 5 is a portion of a seal assembly 60 that shows a non-segmented rigid secondary seal 62. In this example, the stator interface elements are joined together to form a non-segmented stator interface element 64.

Figure 6:
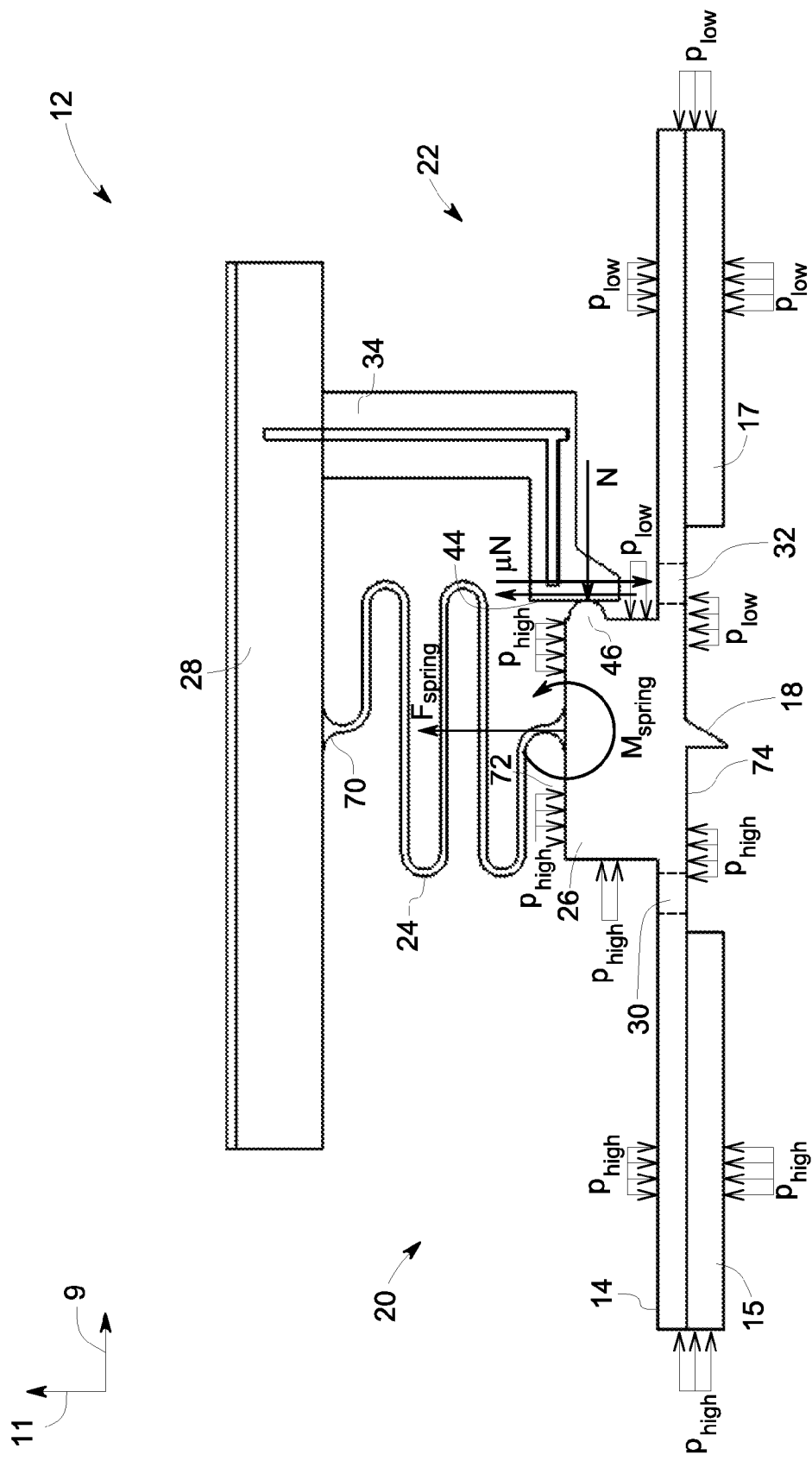
FIG. 6 is a side view of the sealing segment (shown in FIG. 1 and FIG. 2) showing various pressure forces acting on the shoe plate and the rigid segmented secondary seal in accordance with an example of the present invention.

FIG. 6 is a side view of the sealing segment 12 (shown in FIG. 1 and FIG. 2) showing various pressure forces acting on the shoe plate 14 and the rigid segmented secondary seal 34 in accordance with an example of the present technology. The one or more forward ports 30 on the shoe plate 14 allow high pressure fluids to a cavity upstream of the labyrinth teeth 18. The one or more aft ports 32 allow low pressure fluids to a cavity downstream of the labyrinth teeth 18. The presence of the forward ports 30 allow the forward load-bearing section 15 and the non-rotor-facing side of the shoe plate 14 to experience high pressure force $P_{high}$, thereby almost zero net force in an aerostatic mode of operation. As shown, at the high pressure side 20, the pressure forces $P_{high}$ act vertically down on top of the shoe plate 14 while the pressure forces $P_{high}$ also act upwards on the load bearing section 15, thereby, balancing the forces on the front side of the shoe plate 14. It is to be noted that in the aerostatic mode of operation, the seal assembly operates with pressure at low or high speeds when the shoe plate-rotor gap is large (more than about 1/1000 inches) such that rotation of rotor (not shown) does not affect forces on the sealing segment 12. Similarly, the presence of the aft crossover ports 32 allow the aft load-bearing section 17 (rotor facing) and non-rotor-facing side of the shoe plate 14 to experience low pressure $P_{low}$, thereby experiencing almost zero net force in the aerostatic mode of operation. As shown, the aft side of the shoe plate 14 experiences pressure forces $P_{low}$ vertically down on top of the shoe plate 14 and upwards on the load bearing section 17 causing balanced forces acting on the aft side of the shoe plate 14.

Upon pressurization, the axial pressure load causes the nose protrusion 46 of the pedestal 26 to contact the mating flat radial surface 44 on the rigid segmented secondary seal 34. The nose protrusion 46 on each of the neighboring shoe plates 14 forms the line contact with the flat radial surfaces 44 on the rigid segmented secondary seals. The contact force between the nose protrusion 46 and the flat surface 44 of the rigid segmented secondary seal 34 comprises of a normal reaction N as well as a friction force $\mu N$. This friction force $\mu N$ is small enough to not significantly interfere with the vertical force balance of the sealing segment 12 while simultaneously large enough to dampen any vibrations in the sealing segment 12. Desired values of the normal force N are attained by adjusting the pressure load or axial load on every shoe plate 14. In the current embodiment, the nose protrusion 46 of the pedestal 26 touches the flat radial surface 44 of the rigid segmented secondary seal 34 and remains in contact at all times after pressurization. However, in another example, there may be a gap (no-contact) between the nose protrusion and the flat surface of the rigid segmented secondary seal before pressurization, and this gap may or may not close upon pressurization.

The presence of the labyrinth teeth 18 ensure that some axial extent of the pedestal 26 is subjected to a net radial inward closing force because the pedestal experiences high pressure on its radially outwards face 72, but partial high pressure and partial low pressure on its radially inwards face 74. Further, due to the large initial clearance gap between the load bearing surfaces and the rotor (gaps larger than $\frac{1}{1000}$ inches), there is little aerodynamic force on the load bearing sections 15, 17 caused due to the spinning of the rotor. Therefore, the pedestal 26 of the shoe plate 14 experiences a closing force (radially inwards force). Under the influence of this closing force, the spring resistance (force $F_{spring}$ and moment $M_{spring}$) and nose protrusion friction resistance, the shoe plate 14 moves radially inwards towards the rotor. This radially inwards motion continues until the fluid film becomes thin enough to generate aerodynamic force acting in the radially outwards direction. The seal assembly starts operating in an aerodynamic mode of operation when the clearance between the spinning rotor and the load bearing surfaces is less than $\frac{1}{1000}$ inches.

Figure 7:
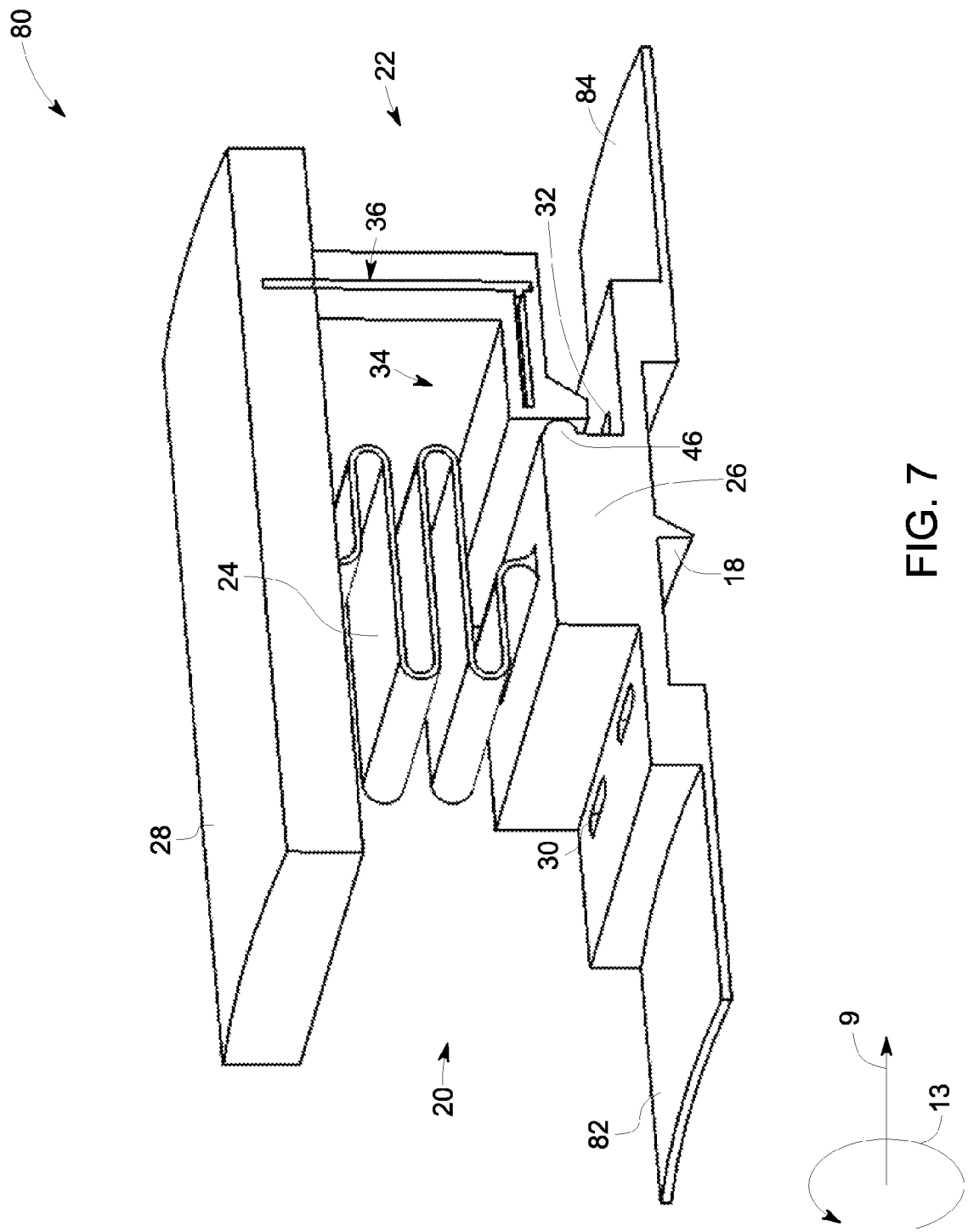
FIG. 7 is a perspective view of a sealing segment in accordance with an example of the present technology.

FIG. 7 is a perspective view of a sealing segment 80 in accordance with an example of the present technology. As shown, the sealing segment 80 includes a forward load bearing segment 82 and an aft load-bearing segment 84 that are relatively compliant and flexible. These flexible load-bearing segments 82, 84 have low stiffness due to their reduced thickness compared with the thicker load bearing sections 15, 17 (shown in FIG. 1 to FIG. 6). Advantageously, the flexible load bearing segments 82, 84 can better adapt to rotor distortions (mechanical and thermal).

Figure 8:
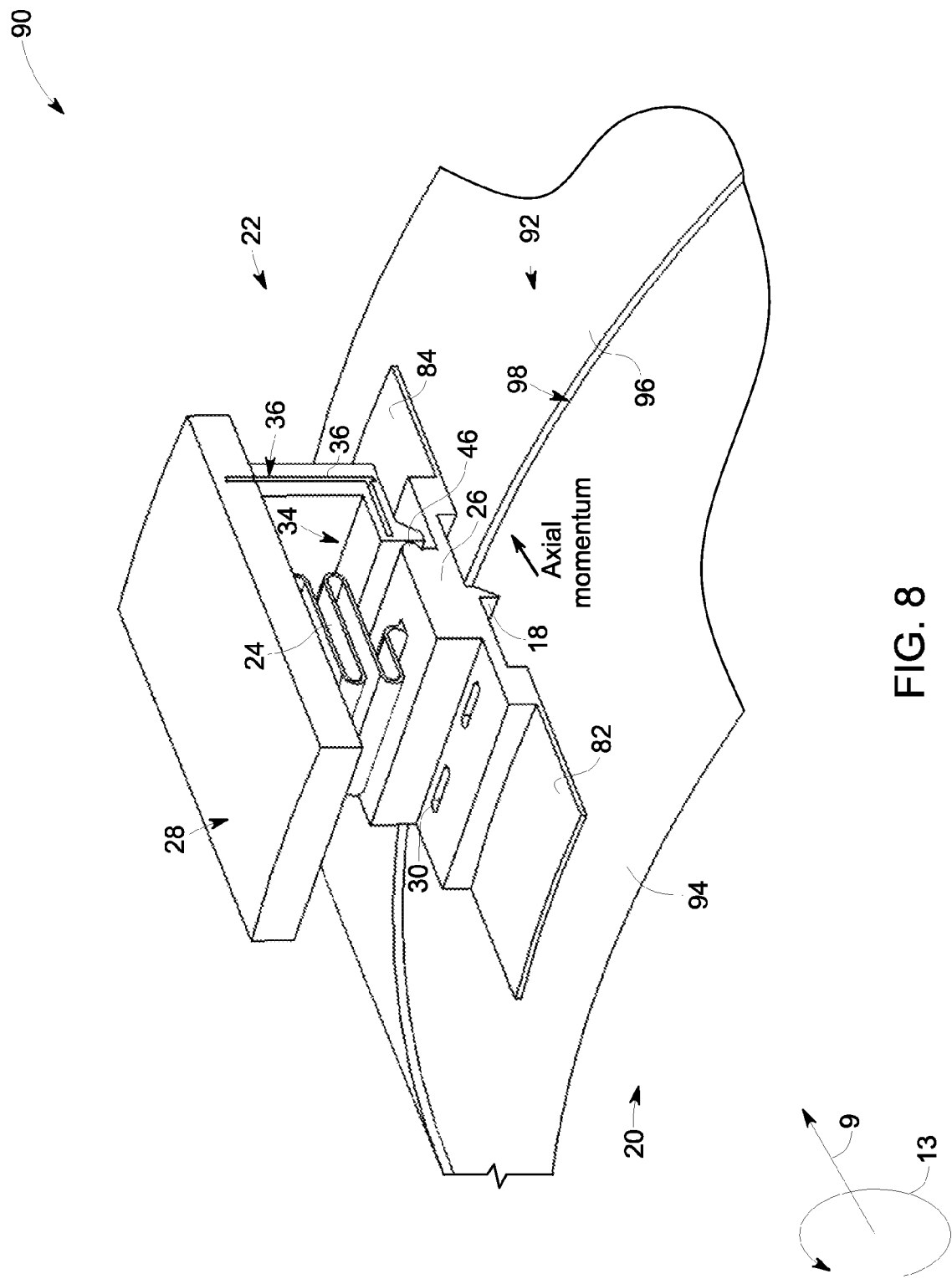
FIG. 8 is a perspective view of a seal assembly having the sealing segment riding a rotor in accordance with an example of the present technology.

FIG. 8 is a perspective view of a seal assembly 90 having the sealing segment 80 riding a rotor 92 in accordance with an example of the present technology. As shown, the rotor 92 is a stepped rotor having a first rotor section 94 and a second rotor section 96 located adjacently in the axial direction 9. In this example, the forward and aft load bearing segments 82, 84 ride on the first rotor section 94 and the second rotor section 96 respectively. As shown, the first rotor section 94 has a rotor radius smaller compared to the rotor radius of the second rotor section 96. This creates a radial step 98 on the rotor 92, which serves to decelerate the fluid axial momentum created by pressure drop across the one or more labyrinth teeth 18. This axial momentum deceleration allows for reliable operation of the seal assembly 90. In other examples (not shown here), the forward load-bearing segment 82 may ride against a rotor with radius larger than the radius of the rotor interfacing with the aft load-bearing segment 84. The one or more labyrinth teeth 18 are always set at the same radial gap as the forward load-bearing segment 82.

Figure 9:
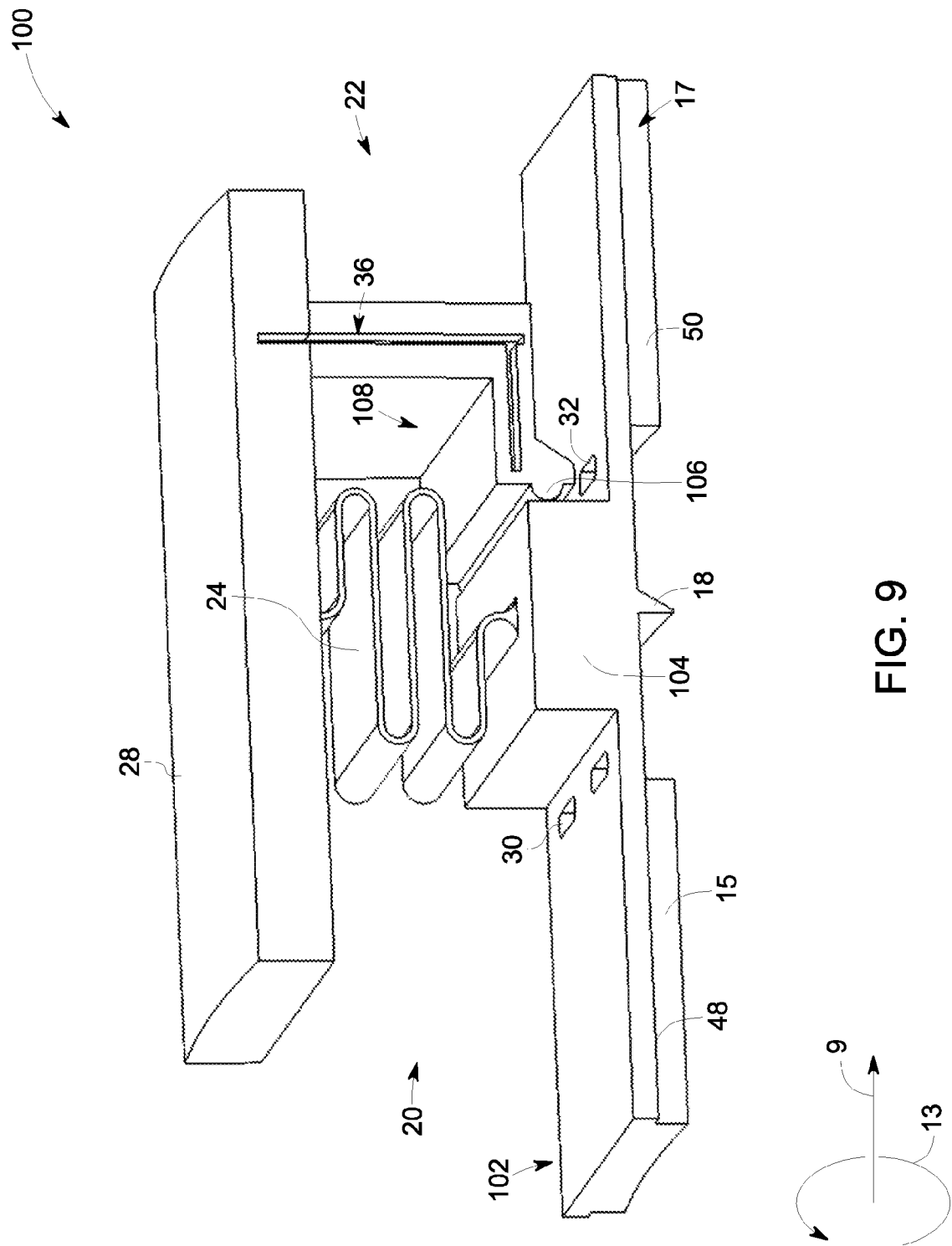
FIG. 9 is a perspective view of the sealing segment in accordance with another example of the present technology.

FIG. 9 is a perspective view of the sealing segment 100 in accordance with an example of the present technology. As shown, the sealing segment 100 includes a shoe plate 102 having a pedestal 104 in line contact with a nose protrusion 106 of a rigid segmented secondary seal 108. The other features on the sealing segment 100 remain similar to the features of the sealing segment 12 as shown in FIG. 2.

Figure 10:
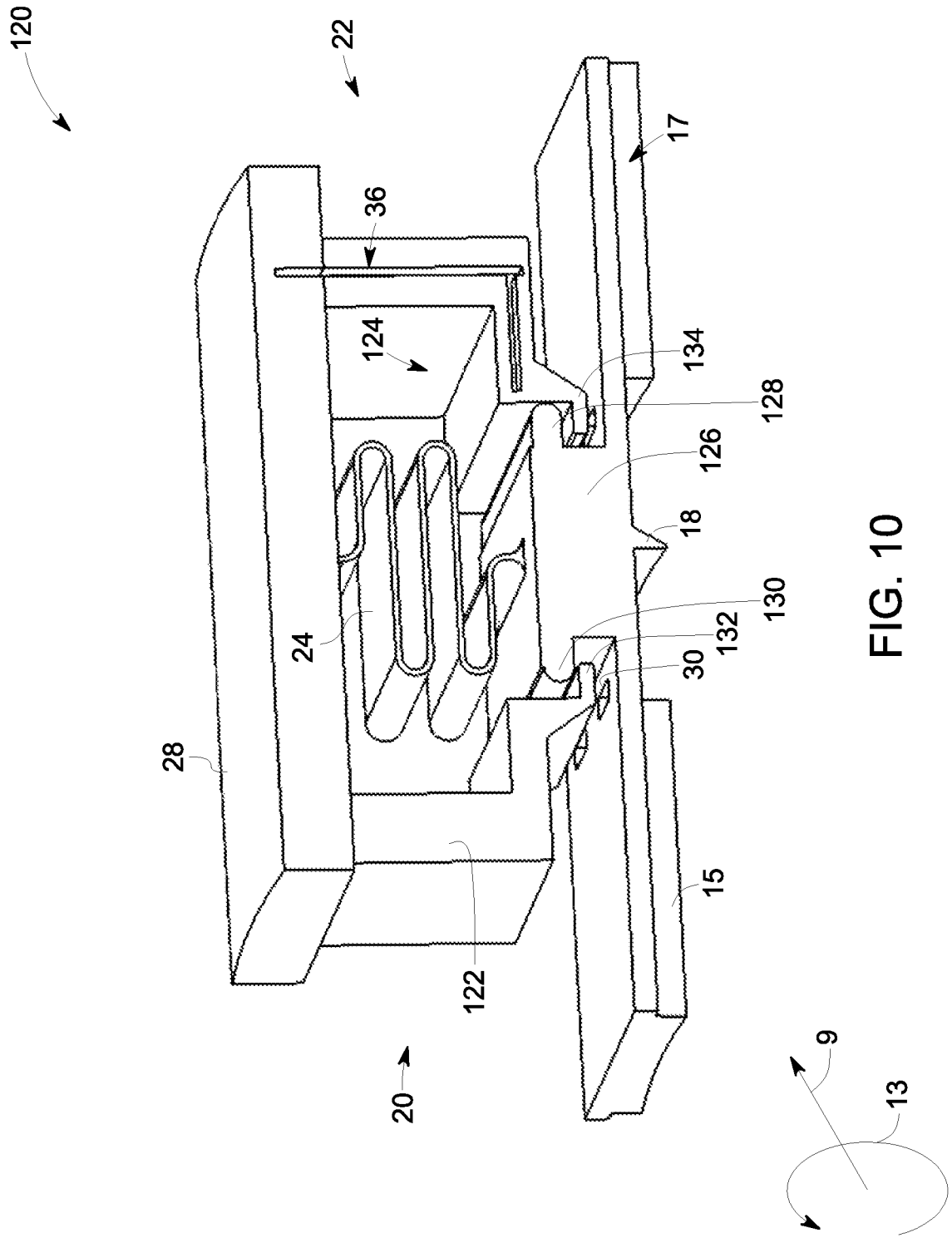
FIG. 10 is a perspective view of the sealing segment in accordance with an example of the present technology.

FIG. 10 is a perspective view of the sealing segment 120 in accordance with an example of the present technology. The sealing segment 120 includes a forward support 122 and an aft segmented secondary seal 124, each formed by a forward L-shaped structure and an aft L-shaped structure respectively. The sealing segment 120 also includes a pedestal 126 that has two protruding extensions, an aft nose protrusion 128 and a forward nose protrusion 130. Further, the forward support 122 and the aft segmented secondary seal 124 include a forward extension 132 and an aft extension 134 respectively. As shown, both the forward extension 132 and the aft extension 134 act as radially inwards motion limiters for the forward and aft nose protrusion 130, 128 respectively. This ensures that upon radially inwards closure of the sealing segment 120, the load-bearing sections 15, 17 are almost parallel to the rotor (not shown) and the rotor can transition from aerostatic to aerodynamic mode of operation in a smooth manner.

Figure 11:
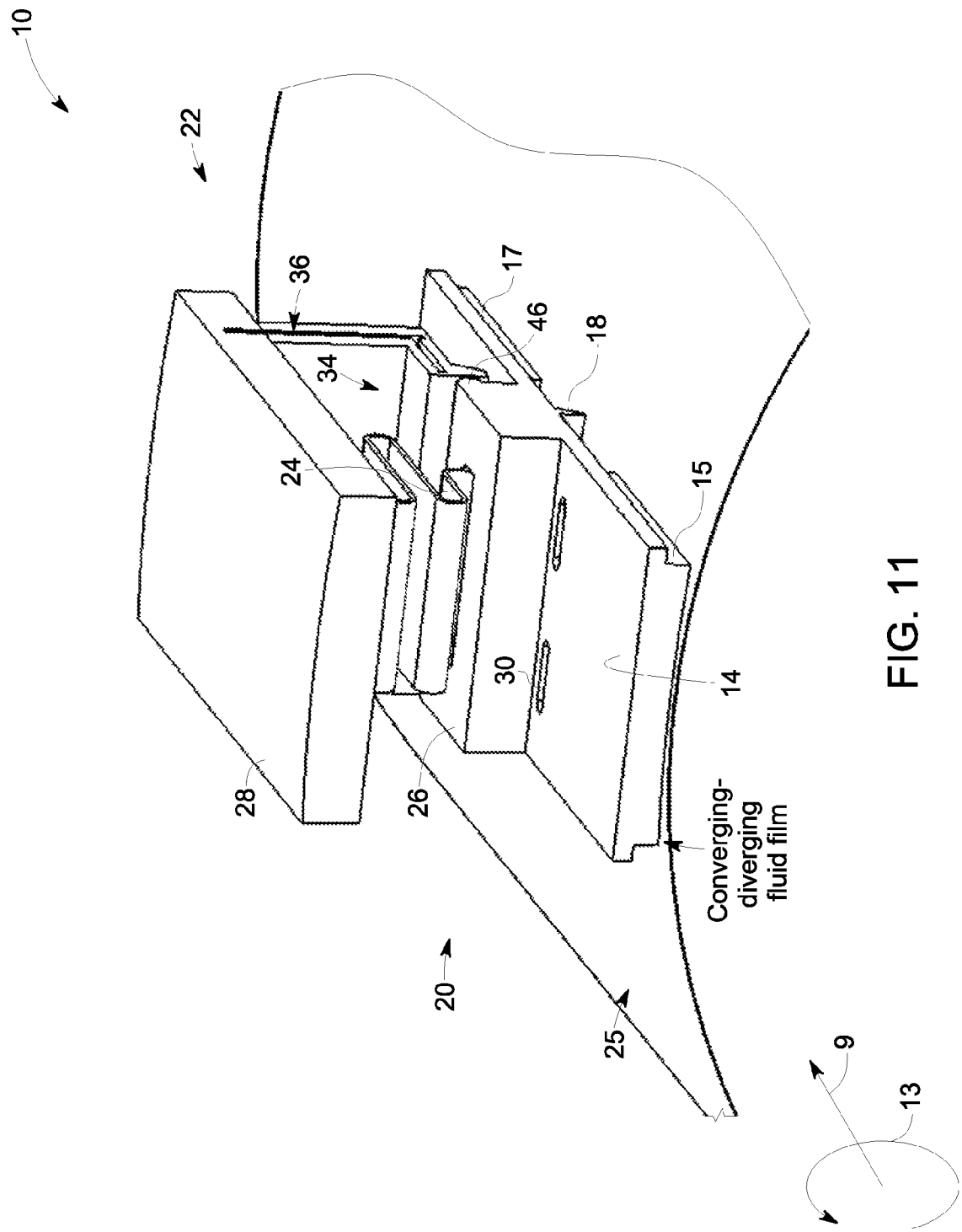
FIG. 11 shows a shoe-rotor curvature in the aerodynamic seal assembly in accordance with an example of the present technology.

FIG. 11 shows shoe-rotor curvature in the aerodynamic seal assembly 10 in accordance with an example of the present technology. In this example, the seal assembly 10 operates in the aerodynamic mode of operation. When the rotor-shoe plate gap starts reducing (e.g. during a thermal or mechanical transient event causing clearance change), the thin fluid film starts building additional pressure. In this embodiment, the radius of curvature of the shoe plate 14 is intentionally machined to be larger than the rotor radius. As a consequence, when the rotor-shoe plate gap becomes small (less than $\frac{1}{1000}$ inch), the fluid film is either monotonically converging or converging-diverging in the direction of rotation. This fluid film in a form of fluid wedge causes additional pressure to build-up. The physics of thin film is well understood from hydrodynamic journal bearings or foil bearings, and can be modeled using appropriate fluid flow models. The basic principle is that any negative gradient in the fluid film thickness in the direction of rotation will increase the pressure in the fluid film above its boundary pressure. The additional pressure caused by the thin fluid film keeps the shoe plate 14 from contacting the spinning rotor 25. Any outward excursion of the rotor 25 is tracked by the shoe plate 14 on every sealing segment 12.

Figure 12:
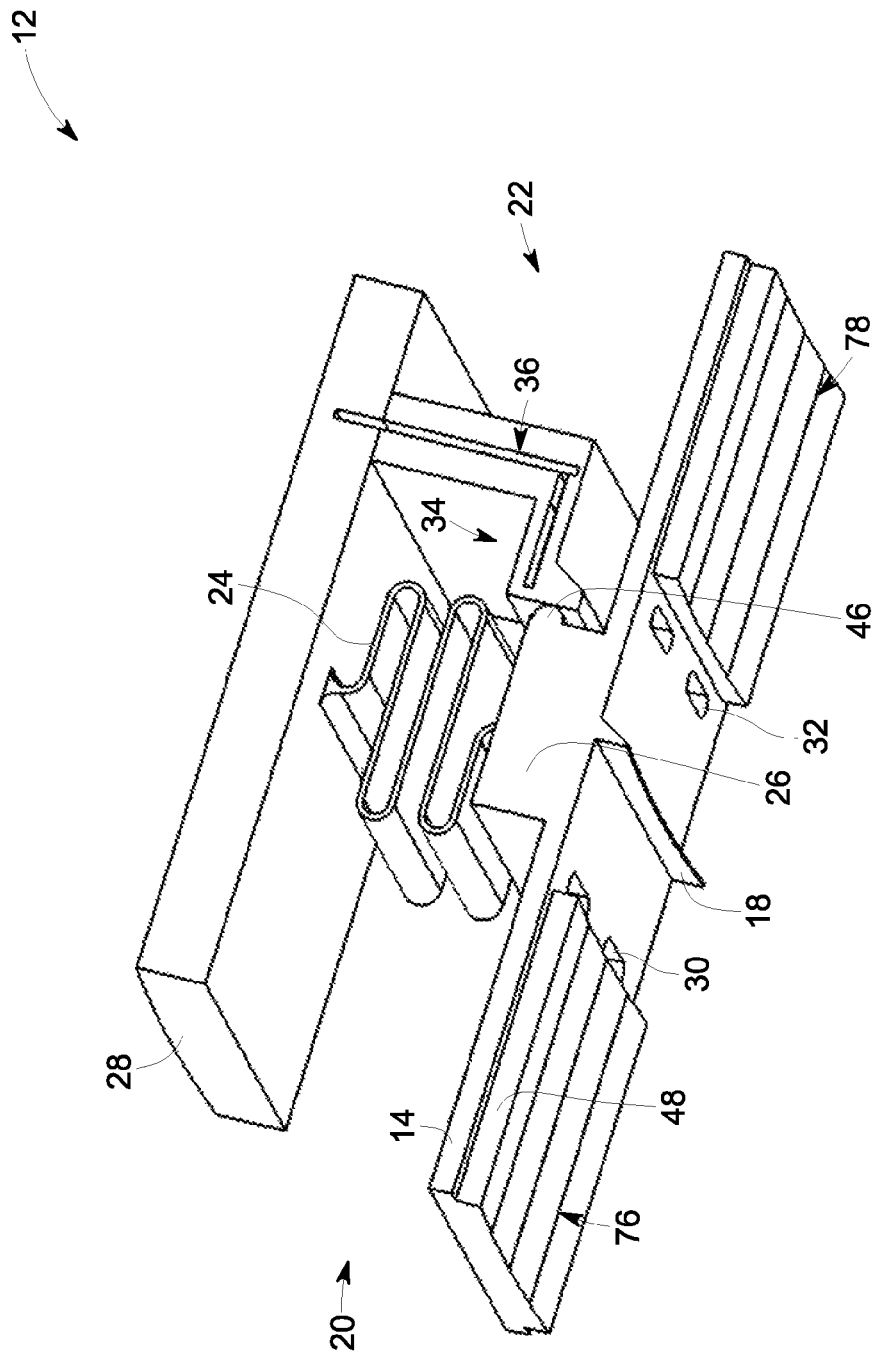
FIG. 12 shows a sealing segment having one or more Rayleigh steps on the load bearing sections in accordance with an example of the present technology.
Figure 12:
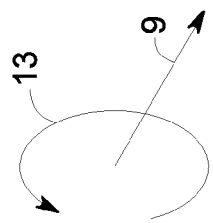

In another example as shown in FIG. 12, the thin fluid film generates additional aerodynamic force due to the presence of one or more Rayleigh steps on the load bearing sections of the shoe plate 14 in the direction of rotation. As shown, the shoe plate includes a forward load bearing section 76 having one or more Rayleigh steps and an aft after bearing section 78 having one or more Rayleigh steps. It should be noted that the multiple forward ports 50 and one or more aft ports 52 also serve the purpose as cooling ports for carrying away the additional heat that might be generated in the thin film aerodynamic mode of seal operation.

Figure 13:
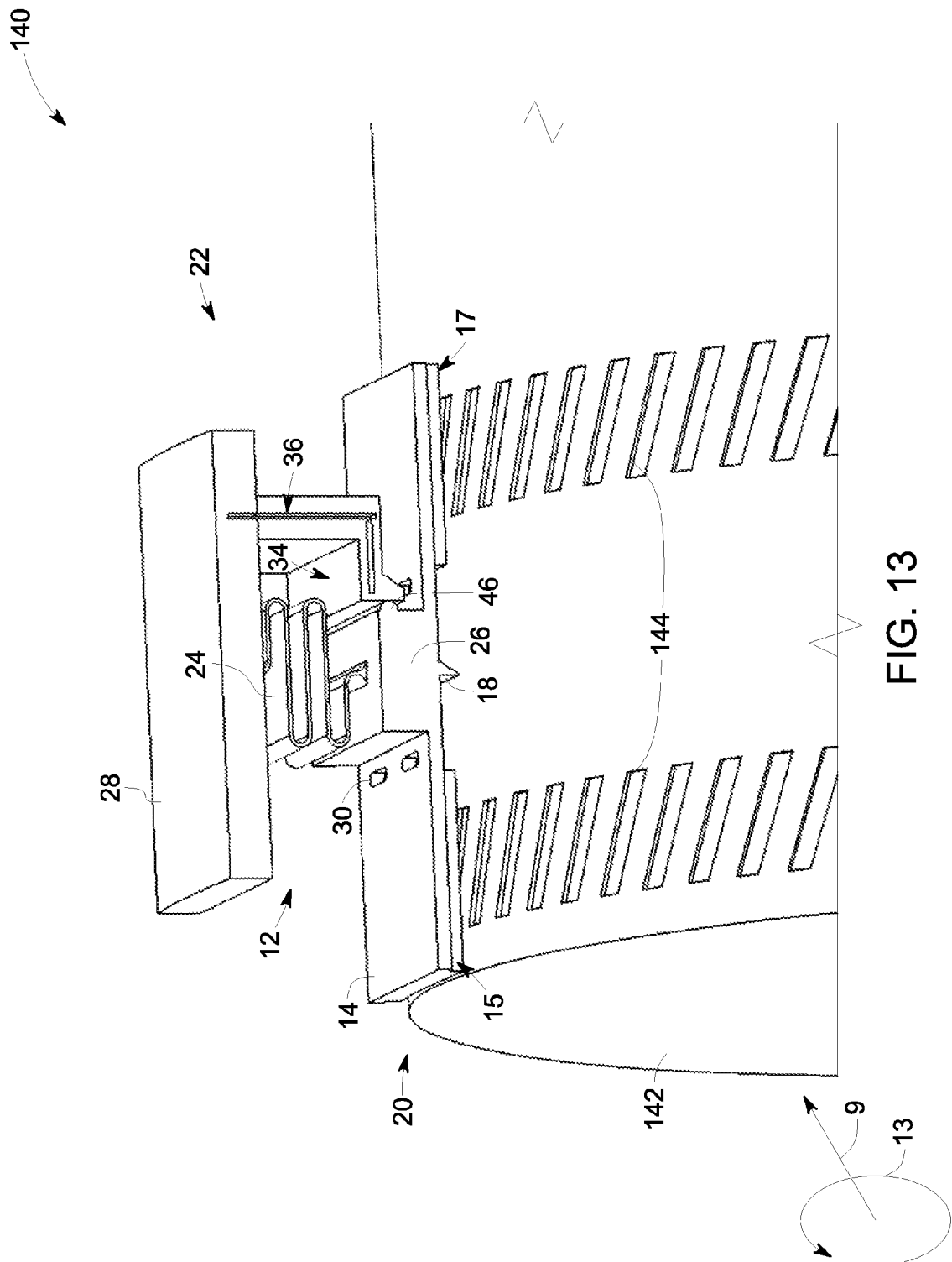
FIG. 13 shows a sealing assembly having a sealing segment (as shown in FIG. 2) riding on a rotor having multiple grooves in accordance with an example of the present technology.

Further, in yet another example as shown in FIG. 13, a seal assembly 140 includes the sealing segment 12 (as shown in FIG. 2) riding on a rotor 142 having multiple grooves 144 that allow the fluid film between the spinning rotor 142 and the load bearing sections 15, 17 to generate an aerodynamic force. This aerodynamic force has feedback characteristics such that a smaller running clearance generates a larger aerodynamic force. This characteristic of the aerodynamic force allows the shoe to find an equilibrium running clearance such that the aerodynamic force and aerodynamic moments generated by the fluid film can support the net closing force & moment load described earlier in the aerostatic mode of operation. Thus, the shoe plate 14 rides on a fluid film (non-contact operation) such that the radially inwards aerostatic closing force, the radially outwards aerodynamic film force, the spring and nose friction resistance are in equilibrium.

In a non-limiting example, both the bellows spring 24 and the rigid segmented secondary seal 34 (as shown in FIG. 2) are formed from high temperature metal alloy shims like Inconel X750 or Rene41. The rigid segmented secondary seal 34 is cantilevered (brazed) to the stator interface element 28. In one example, the shoe plate 14 and the stator interface piece or the top interface element 28 are machined or cast. In one embodiment, the radially innermost surface of the shoe plate may be coated with lubricating coatings like NASA PS304 or NASA PS400 or a similar coating that can handle unintentional rubs between the shoe plate 14 and the rotor. In another embodiment, the rotor surface interfacing with the shoe plate 14 may be coated with Chromium carbide or Titanium aluminum Nitride or similar coatings to improve the rotor's hardness, corrosion resistance and ability to maintain good surface finish.

Figure 14:
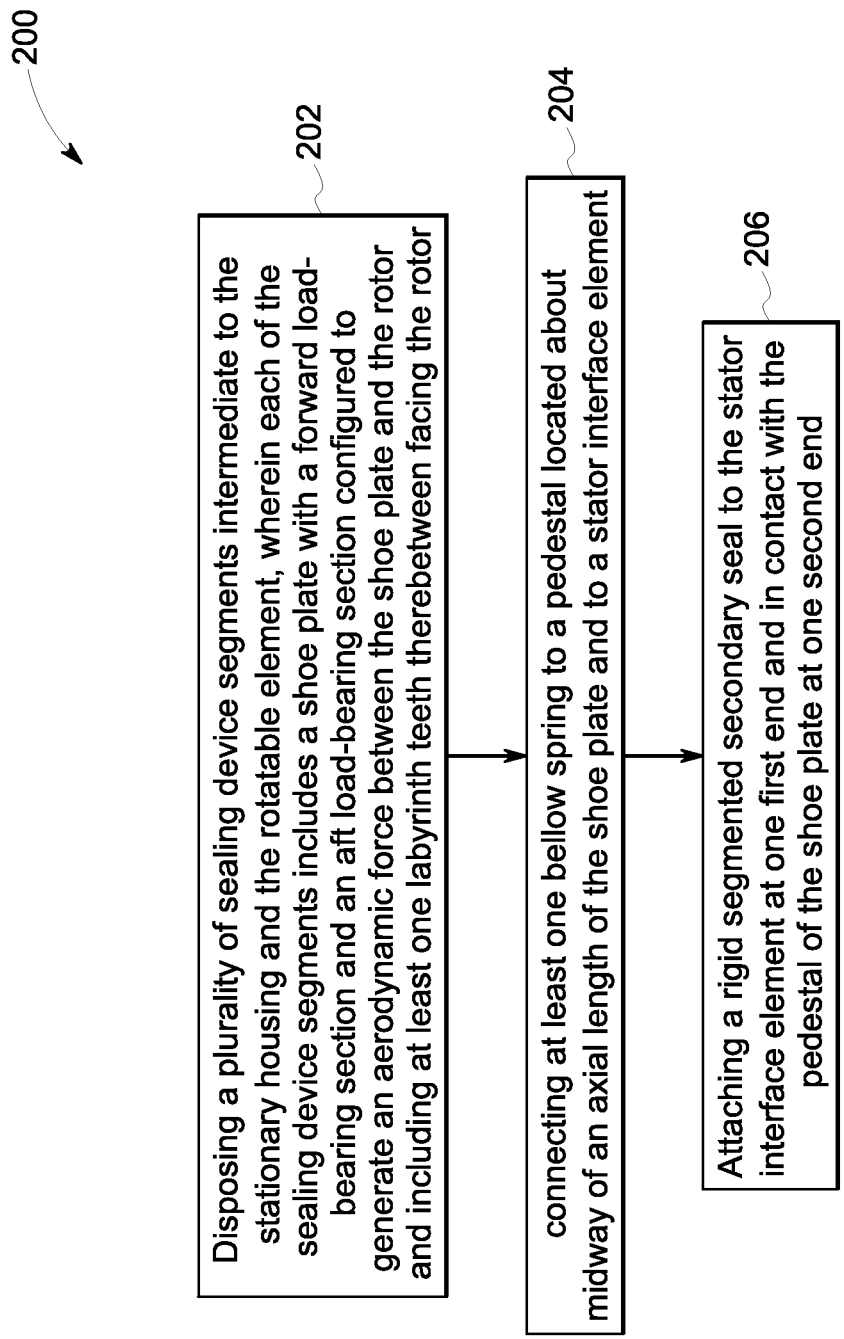
FIG. 14 is flow chart illustrating exemplary steps involved in method of forming an aerodynamic seal between a stationary housing of a rotary machine and a rotatable element turning about an axis of the rotary machine in accordance with an embodiment of the present invention.

FIG. 14 is flow chart 200 illustrating steps involved in method of forming an aerodynamic seal between a stationary housing of a rotary machine and a rotatable element turning about an axis of the rotary machine in accordance with an embodiment of the present invention. At step 202, the method includes disposing a plurality of sealing segments intermediate to the stationary housing and the rotatable element. Each of the sealing segments includes a shoe plate with a forward load-bearing section and an aft load-bearing section configured to generate an aerodynamic force between the shoe plate and the rotor and includes at least one labyrinth teeth therebetween facing the rotor. At step 204, the method includes connecting at least one bellow spring to a pedestal located about midway of an axial length of the shoe plate and to a stator interface element. Finally, at step 206, the method includes attaching a rigid segmented secondary seal to the stator interface element at one first end and in contact with the pedestal of the shoe plate at one second end.

Advantageously, the present aerodynamic seal assemblies are reliable, robust seal for several locations in rotating machinery with high pressure drops and large transients. The seal assemblies are also economical to fabricate. The non-contact operation of the seals makes them especially attractive for the large rotor transient locations. Further, the present technology allows for a shoe plate to remain parallel to the rotor in aerostatic operation and translate parallel to the rotor during the aerodynamic mode. The present technology also includes improved predictability for aerostatic force balance and for the radial motion (increased predictability for leakage performance and robustness) and allows the seal assembly to have large assembly clearance and pressure-actuate them towards the rotor. The axial location of the bellow spring and nose friction force at the center of the load-bearing surfaces allows for reliable seal operation as well. The presence of forward and aft ports as well as the feeding grooves provides for optimal pressure distributions on the shoe plate and also provides cooling flow around the shoe plate. Furthermore, the circular shape of the protruding nose of either pedestal or the rigid segmented secondary seal allows for line contact and effective sealing even under tilted state of shoe relative to the rigid segmented secondary seal. This is due to differential pressure across the sealing segment that causes the pedestal to move axially towards low pressure side, thereby, effectively contacting with the rigid segmented secondary seal. Advantageously, the flexible load bearing segments of the shoe plate are relatively compliant and thus, are capable of adapting to rotor distortions (mechanical and thermal). Also, in one example, the multiple grooves located on the spinning rotor allow a fluid film to develop between the spinning rotor and the load bearing sections of the shoe plate such that there is generation of an aerodynamic force causing reliable seal operation.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional systems and techniques in accordance with principles of this disclosure. Of course, it is to be understood that not necessarily all such objects or advantages described above may be achieved in accordance with any particular embodiment. Thus, for example, those skilled in the art will recognize that the systems and techniques described herein may be embodied or carried out in a manner that achieves or optimizes one advantage or group of advantages as taught herein without necessarily achieving other objects or advantages as may be taught or suggested herein.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. An aerodynamic seal assembly for a rotary machine, the seal assembly comprising:
   a plurality of sealing segments disposed circumferentially intermediate to a stationary housing and a rotor, wherein each of the segments comprises:
      a shoe plate with a forward load-bearing section and an aft load-bearing section configured to generate an aerodynamic force between the shoe plate and the rotor, wherein the shoe plate comprises at least one labyrinth teeth facing the rotor and positioned between the forward load-hearing, section and the aft load-bearin section, wherein the shoe plate is further configured to allow a flow of high pressure fluid into a front portion of the at least one labyrinth teeth and a low pressure fluid into a rear portion of the at least one labyrinth teeth;
      at least one spring connected to a pedestal located about midway of an axial length of the shoe plate and to a stator interface element; and
      a rigid segmented secondary seal attached to the stator interface element at one first end and in contact with the pedestal of the shoe plate at one second end, wherein the rigid segmented secondany seal is L-shaped and comprises of an L-shaped spline slot forming a radial spline slot and an axial spline slot located at sides of the L-shaped secondary seal for allowing splines to be inserted to prevent fluid leakages between adjacent sealing segments, and wherein the stator interface element comprises a spline slot that is aligned with the radial spline slot on the rigid segmented seal.

2. The aerodynamic seal assembly of claim 1, where the spring is a bellow spring or a flexure.

3. The aerodynamic seal assembly of claim 1, wherein each of the sealing segments comprises a line contact between a free end of the rigid segmented secondary seal and the pedestal of shoe plate separating a high pressure side and a low pressure side on either side of the line contact.

4. The aerodynamic seal assembly of claim 3, wherein the pedestal includes a nose protrusion forming the line contact with a flat radial surface at the free end of the rigid segmented secondary seal.

5. The aerodynamic seal assembly of claim 3, wherein the free end of the rigid segmented secondary seal comprises a nose protrusion forming the line contact with a flat radial surface of the pedestal of the shoe plate facing the low pressure side of the rotary machine.

6. The aerodynamic seal assembly of claim 1, wherein the at least one spring provided in each of the sealing segments comprises a circumferential width less than each of circumferential widths of the stator interface element and the shoe plate.

7. The aerodynamic seal assembly of claim 1, wherein the shoe plate comprises one or more forward ports located on a top portion for allowing the flow of high pressure fluid into the front portion of the at least on labyrinth teeth.

8. The aerodynamic seal assembly of claim 7, wherein the shoe plate comprises one or more aft ports located on the top portion of the shoe plate at a rear side of the pedestal for allowing the low pressure fluid into the rear portion of the at least one labyrinth teeth.

9. The aerodynamic seal assembly of claim 7, wherein the shoe plate comprises a forward shoe feeding groove formed due to different circumferential Width of the top portion of the shoe plate and the forward load-bearing section towards a high pressure side of the rotary machine.

10. The aerodynamic seal assembly of claim 7, wherein the shoe plate comprises an aft shoe feeding groove formed due to different circumferential width of the top portion of the shoe plate and the aft load-bearing section towards a low pressure side of the rotary machine.

11. The aerodynamic seal assembly of claim 7, wherein the one or more forward ports are angled in a circumferential direction to impart swirl to the fluid as the fluid flows from the high pressure side to the front portion of the at least one labyrinth teeth.

12. The aerodynamic seal assembly of claim 1, wherein each of the forward load-bearing section and the aft load-bearing section comprises one or more Rayleigh steps for generating a thin film for an additional radial opening force on the sealing segment.

13. The aerodynamic seal assembly of claim 1, wherein one side of the shoe plate facing the rotor comprises a curvature larger than the curvature of the rotor.

14. The aerodynamic seal assembly of claim 1, wherein each of the forward load-bearing section and the aft load-bearing section is flexible due to small radial thickness.

15. The aerodynamic seal assembly of claim 1, further comprising the rotor with different radius along the axial direction about the at least one labyrinth teeth forming a radial step on the rotor for decelerating axial momentum of the fluids flowing axially from high pressure side to the low pressure side of the rotary machine.

16. The aerodynamic seal assembly of claim 1, further comprising the rotor having a plurality of grooves for generating aerodynamic force during operation of the rotary machine.

17. The aerodynamic seal assembly of claim 1, wherein the stator interface elements are joined together to form a non-segmented stator interface.

18. The aerodynamic seal assembly of claim 1, wherein the rigid segmented, secondary seal segments are joined together to form a non-segmented rigid, secondary seal.

19. A rotary machine, comprising:
an aerodynamic seal assembly comprising a plurality of sealing segments disposed circumferentially intermediate to a stationary housing and a rotor, wherein each of the segments comprises:

a shoe plate with a forward load-bearing section and an aft load-bearing section configured to generate an aerodynamic force between the shoe plate and the rotor, wherein the shoe plate comprises at least one labyrinth teeth facing the rotor and positioned between the forward load-bearing section and the aft load-bearing section, wherein the shoe plate is further configured to allow a flow of high pressure fluid into a front portion of the at least one labyrinth teeth and a low pressure fluid into a rear portion of the at least one labyrinth teeth;

at least one spring connected to a pedestal located about midway of an axial length of the shoe plate and to a stator interface element; and a rigid segmented secondary seal attached to the stator interface element at one first end and in contact with the sedestal of the shoe plate at one second end, wherein the rigid segmented secondary seal is L-shaped and comprises of an L-shaped spline slot forming a radial spline slot and an axial spline slot located at sides of the L-shaped secondary seal for allowing splines to be inserted to prevent fluid leakages between adjacent sealing segments.

20. The rotary machine of claim 19, further comprising a plurality of splines seals inserted between adjacent sealing segments into the L-shaped spline slots.

21. An aerodynamic seal assembly for a rotary machine, the seal assembly comprisises:

a plurality of sealing segments disposed circumferentially intermediate to a stationary housing and a rotor, wherein each of the segments comprises:

a shoe plate with a forward load-bearing section and an aft load-bearing section configured to generate an aerodynamic force between the shoe plate and the rotor, wherein the shoe plate comprises at least one labyrinth teeth facing the rotor and positioned between the forward load-bearing section and the aft load-bearing section, wherein the shoe plate is further configured to allow a flow of high pressure fluid into a front portion of the at least one labyrinth teeth and a low pressure fluid into a rear portion of the at least one labyrinth teeth;

at least one spring connected to a pedestal located about midway of an axial length of the shoe plate and to a stator interface element; and a rigid segmented secondary seal attached to the stator interface element and in contact with the pedestal of the shoe plate, further comprising a forward support attached to the stator interface element and in contact with a front side of the pedestal of the shoe plate.

22. The aerodynamic seal assembly of claim 21, wherein the forward support is a L-shaped structure having a circumferential width less than each of circumferential widths of the stator interface element and the shoe plate.

* * * * *